Patented Mar. 14, 1939

2,150,625

UNITED STATES PATENT OFFICE 2,150,625

METHOD OF MAKING FLUX FOR USE IN ELECTRIC WELDING

Lloyd Theodore Jones, Harry Edward Kennedy, and Maynard Arthur Rotermund, Berkeley, Calif., assignors by mesne assignments, to Union Carbide and Carbon Corporation, a corporation of New York No Drawing. Original application October 9, 1935, Serial No. 44,142. Divided and this application March 11, 1936, Serial No. 68,300. Renewed July 1, 1938

3 Claims. (Cl. 148—26)

This invention relates to a method of making a flux for use in electric welding, and this application is a division of our copending application Serial Number 44,142, filed October 9, 1935, which issued June 9, 1936 as U. S. Pat. No. 2,043,960.

The simplicity of bare wire-electrode welding recommends it above all other methods, but the metallurgical and physical properties of metal deposited in this simple manner are usually so poor that the method is unsuitable for many applications.

In order to avoid certain difficulties encountered in bare metal arc welding, it is customary to protect the freshly deposited molten metal with a blanket of molten metal compounds (usually compounds of the alkali or alkaline earth metals). The material used for forming this blanket is called the "flux". The usual method of providing a flux blanket on the weld is to encase the welding rod or wire (usually referred to as the electrode) in an adherent sheath of solid flux, and this gives rise to other difficulties. The sheath is usually fragile and, being nonmetallic in nature, is nonconductive when cold, so that electrical connection must be made with the electrode at points bared for that purpose at intervals at variable distances from the weld, thereby imposing an additional burden on the automatic regulating devices widely used in welding. When the bared sections reach the melting zone metal of inferior quality is deposited. The current must pass through a variable length of rod, the length between the arc and the contact point, heating it sufficiently to crack off the flux covering and further to add an IR-drop to the arc voltage. This IR-drop is not constant in magnitude but varies according to the position of the contact point relative to the arc. The machine, unable to discriminate between arc voltage and electrode drop, cannot maintain the constant arc length so necessary to successful welding unless compensatory means are resorted to. These difficulties therefore limit the energy which may be expended in the arc. We are not aware of current values in excess of about 500 amperes being used in this manner of welding.

An object of the present invention is to avoid the disadvantageous features cited above, and to provide a process by which even thick plates can be strongly and rapidly electrically welded, in a single pass or in a plurality of passes, with a weld of which the density and physical properties are at least equal to those of the parent metal. Another object is to provide a process in which heavier welding currents can be used and the rate of welding accelerated. A further object is to overcome the difficulties which, in prior processes, are caused by the inherent instability of an electric arc, its liability to be extinguished by a variety of adventitious causes, and the difficulty, especially in automatic machines, of reestablishing the arc when it has been extinguished. Another object is to avoid the necessity for a flux sheath on the electrode. Other objects of the invention will become apparent as the description of our invention proceeds.

We have discovered and claimed in our copending patent of which this is a division, a novel process for electric welding wherein the necessary heat is generated by the passage of a heavy electric current between a metal electrode (usually bare) and the metal plates or similar objects to be welded, the electrode being out of mechanical contact with the objects and the current being carried across the gap between the electrode and the objects by and through a conductive melt or welding composition having appropriate electrical resistance properties. The heat thus generated melts successive portions of the electrode and the molten material is deposited as weld filler material. The welding composition serves as an active instrumentality, or welding medium, inasmuch as it provides heating means, controls the rate, penetration, and quality of welding, purifies the molten metal, and protects the molten metal.

A large number of experimental welds which we have made support the conclusion that the properties of a successful welding composition for this method of welding are these:

(1) The chemical reactions between the components of the welding composition must be completed before it is used in welding. Failure in this regard most surely invites porosity.

(2) It must be capable of controlling the penetration and the width of the weld.

(3) Its fluidity at welding temperatures must be such that it will not become entrained with the molten metal.

(4) It must consist of chemicals which are not detrimental to the properties of the steel, and (5) It must be readily removable from the finished weld.

The composition of the welding medium is of the utmost importance. The particular composition that is to be used is determined by the quality and thickness of the metal plates to be welded, by the current and voltage to be used, and by the properties it is desired to impart to the weld metal.

We have used calcium silicate and silicates of sodium, barium, iron, manganese, cobalt, magnesium, nickel and aluminum, both in binary and ternary combinations, in various proportions. We have also used calcium titanate and various titano-silicates, these being used when it is desired to introduce titanium into the weld metal. While a number of these conductive welding compositions are more or less efficacious in our process, we prefer to use silicates of the alkaline earth metals, such as calcium silicate, and we also prefer to add to these silicates minor proportions of alumina and of a substance adapted to lower the melting point, for example, a halide salt.

More specifically, the welding composition preferably comprises, as its principal ingredients, silica ($SiO_2$), at least one basic constituent consisting of an alkaline earth such as lime (CaO) or magnesium (MgO) or a mixture thereof, and alumina ($Al_2O_3$). The silica and basic constituent are in approximately the proportions theoretically required to form metasilicates, although a substantial excess of silica is permissible and frequently advisable. For example, if the basic constituent is lime, the proportions by weight will be approximately 0.7 to 1 part of CaO to 1 part of $SiO_2$; and if magnesia is substituted for part or all of the lime, the silica is increased accordingly, so as to maintain about the same stoichiometric proportions. The alumina forms about 1% to 8%, by weight, of the welding composition, and preferably about 4% to 6%. In order to cause the energy to be distributed over a larger area we add, in various minor proportions, say 6%, a material capable of reducing the energy concentration and thereby widening the weld. A preferred material for this purpose is a halide salt such as calcium fluoride.

The basic constituent preferably consists chiefly of lime and magnesia in approximately the proportions of three parts of CaO to one part of MgO, by weight; but other proportions are useful and within the invention. Basic materials other than lime or magnesia, for example oxides of manganese, titanium, or the alkali metals, may be added in moderate amounts without greatly changing the essential characteristics of the welding composition, and known fluxing agents such as borax or boric acid may be added in moderate amounts, but it is important that the composition be substantially free from iron oxides uncombined with other ingredients of the composition (by being prefused with such ingredients, for instance), and from material (such as carbonates or moisture) which evolve detrimental amounts of gas or vapor at welding temperatures.

It is possible, and may at times be desirable, to include in the welding composition materials which are transferred to the weld filler material during the welding operation and appear in and modify the properties of the completed weld, for example: ferromanganese, ferrosilicon, ferrochromium, calcium molybdate, carbon, or chemical compounds thereof.

In a specific instance, we fused together 50 pounds of calcium carbonate, 9.4 pounds of magnesium oxide, and 40.5 pounds of silica until the reaction was complete. The materials used were of the purest quality used in the ceramic industries, but the fused product on analysis showed the presence of about 5% alumina. The fused material was cooled and granulated, and to each pound, one ounce of fluorspar was added. The material was then ready for use to form the conductive melt which is the principal feature of our process.

Welding compositions which have been used successfully and which serve as representative examples within the invention have the following analyses, by weight:

|  | I | II | III | IV |
|---|---|---|---|---|
| Percent CaO | 29.5 | 31.24 | 29.18 | 40.12 |
| Percent MgO | 8.7 | 11.01 | 8.26 | 0.89 |
| Percent $SiO_2$ | 56.4 | 52.40 | 57.48 | 52.94 |
| Percent $Al_2O_3$ | 5.4 | 4.11 | 4.86 | 5.80 |
| Percent $Fe_2O_3$ | Low | 0.13 | 0.24 | 0.23 |

Before use, about 1 part of calcium fluoride was added to 16 parts, by weight, of each of the above compositions.

The chemical condition of the welding composition or medium is important: the acidic and basic constituents should be reacted, the composition should be substantially anhydrous and free from gases, and all reactions which would evolve deleterious amounts of gases during welding should be substantially completed, before the medium is used in the welding process. These conditions are suitably attained by prefusing a mixture of the constituents, preferably in an electric furnace. Certain relatively volatile but chemically stable constituents such as calcium fluoride may be added to the medium either before or after the other ingredients have been fused and cooled. The carbonates of calcium or magnesium may be substituted for the oxides, of course, if the ingredients are prefused.

The physical condition of the welding composition is likewise of the utmost importance. If, according to the present invention, the molten medium is rapidly solidified by cooling, before grinding and use, more homogeneous and solid welds may be produced than when it slowly loses heat and solidifies. The fused composition is preferably cast as a relatively thin layer or section against efficient cooling or chilling means such as a cold heavy plate or block of metal, or a water-cooled chill plate, rather than as a large ingot. It is preferred that the rate of cooling be such that substantially all of the solidified welding composition is characterized by a vitreous luster on fracture.

In the preferred welding method employing the flux produced by the process of the invention, the end of the welding electrode, which is preferably a bare metal electrode, is first inserted into the welding composition. Since the composition is nonconductive when cold, a conductive path for the welding current is provided by bridging the gap between the electrode and the work with, for example, a sliver of graphite or a wad of steel wool. The power is then applied, the welding composition is locally heated until it fuses and becomes conductive, and immediately thereafter the end of the electrode begins to fuse and the molten metal begins to deposit in the groove. At the same time the edges of the objects being welded begin to fuse and to coalesce with the deposited metal. The electrode is then fed toward the work and moved along the seam at an appropriate rate, preferably by a mechanical device which may be similar to those which are extensively used in open arc welding, and the welding proceeds without interruption.

The welding proceeds under the composition unobstrusively. There is practically no puffing or visible displacement of the welding medium, no visible sparking, and indeed, scarcely any external evidence that a weld is being made. The weld is ordinarily completed in one pass, even in thick plate. The welding composition in front of the electrode remains unfused, while the fused composition rises to the top of the completed portion of the weld and solidifies. Even this effect is scarcely visible because of the use of an excess of the welding composition which remains unfused and covers the fused composition and metal.

It is possible in our process to use either alternating or direct current, or direct current superimposed on alternating current. Alternating current alone is preferred.

Welds made by this process have certain distinguishing characteristics. A cross section of the weld shows, in most cases, that the planes defining the ultimate zone of fusion at the sides of the weld are approximately parallel. This relation is almost independent of the character of the V and obtains whether the parts are preliminarily beveled to a wide V, to a narrow V, or are not beveled at all. The deposit of metal occurs, not directly under the electrode, but back of it, and there appear to be liquid currents (possibly caused by the so-called "pinch effect") which cause the surface of the resistive composition to be depressed at the point where it is first fused, that is, just behind the electrode, and cause both the deposited metal and the conductive melt to be heaped up back of the electrode. This facilitates the production of a weld having the desirable upwardly convex surface, with some excess metal above the seam, which can either be machined off or, as in the usual practice, left for reinforcement. The relatively high current densities which are preferably used superheat the molten metal and welding composition, making them highly fluid. The liquid currents set up in this highly fluid mass effectively mix the metal and welding composition, thereby washing impurities out of the metal, and then completely separate the metal as it is deposited. As a result, unusually clean and strong metal is deposited. Since the amount of metal solidifying is uniformly wide, unequal stresses, which would tend to warp the plate, are not created, and the weld is of such low internal stress that no evidence of plate deflection is apparent after its completion.

The conductive welding composition used in our process doubtless performs the protective functions of a flux, but it is much more than a flux, and many compositions which are satisfactory fluxes for arc welding are unsuitable for our purpose. When an electric current is passed through a material which becomes a Nernst conductor at a low temperature a relatively large area of the material will be engaged in the conduction. Common salt (NaCl) is a material of this class: if it is used, the current is conducted from the electrode to the plate almost entirely by the fused electrolyte. So much salt is involved in the conduction that the energy density is insufficient to produce fusion of the plate or wire. If, on the other hand, a material becomes a Nernst conductor at an exceedingly high temperature, very little of the material is involved in the conduction, the energy is thereby so concentrated as to melt very deeply and with very small cross section. By a proper selection of welding composition, as explained hereinabove, the energy density on the parts to be welded may be satisfactorily controlled and the production of a sound weld may be assured.

We claim:

1. Process of making an electric welding composition which comprises melting together silica and at least one basic constituent of the group consisting of lime and magnesia, and alumina, the basic constituent or constituents being present in an amount between about 70% and about 100% of that theoretically required to combine with all of the silica to form metasilicate or metasilicates, and the alumina forming about 1% to 8% of the composition, and then casting the resulting melt in a relatively thin layer against cold metal, whereby a vitreous luster on fracture is imparted to the major portion of the welding composition.

2. Process of making an electric welding composition which comprises melting together silica and at least one basic constituent of the group consisting of lime and magnesia, the basic constituent or constituents being present in an amount between about 70% and 100% of that theoretically required to combine with all of the silica to form metasilicate or metasilicates, and then casting the resulting melt in a relatively thin layer against cold metal to impart to at least the major portion of the welding composition a vitreous luster on fracture.

3. Process of making an electric welding composition which comprises melting together silica and at least one basic constituent of the group consisting of lime and magnesia, and then casting the resulting melt in relatively thin section and in contact with cold material to impart to the major part of the welding composition a vitreous luster on fracture.

LLOYD THEODORE JONES.
HARRY EDWARD KENNEDY.
MAYNARD ARTHUR ROTERMUND.